United States Patent [19]
Bramson

[11] Patent Number: 5,365,338
[45] Date of Patent: Nov. 15, 1994

[54] WAVELENGTH SENSOR FOR FIBER OPTIC GYROSCOPE

[75] Inventor: Michael D. Bramson, Ridgecrest, Calif.

[73] Assignee: The United States of America as represented by the Secretary of the Navy, Washington, D.C.

[21] Appl. No.: 706,506

[22] Filed: May 28, 1991

[51] Int. Cl.$^5$ .................... G01B 9/02; H01S 3/083
[52] U.S. Cl. ........................... 356/350; 372/94
[58] Field of Search .................... 356/350; 372/94

[56] References Cited

U.S. PATENT DOCUMENTS

| | | | |
|---|---|---|---|
| 4,514,088 | 4/1985 | Coccoli | 356/350 |
| 4,678,334 | 7/1987 | Coate et al. | 356/350 |
| 4,708,480 | 11/1987 | Sasayama et al. | 356/350 |
| 4,842,358 | 6/1989 | Hall | 356/350 |
| 4,984,861 | 1/1991 | Suchoski, Jr. et al. | |

Primary Examiner—Stephen C. Buczinski
Attorney, Agent, or Firm—Harvey A. Gilbert; Melvin J. Sliwka; John L. Forrest, Jr.

[57] ABSTRACT

An error compensated Mach-Zehnder Interferometer wavelength sensor integrated fiber optic chip for scale factor correction of fiber optic gyroscopes. A 90° twisted optical fiber polarizer couples the light from a point in the gyroscope optical fiber circuit where light is found to have traversed the optical sensing coil of the gyroscope in both directions to the input of the fiber optic Mach-Zehnder Interferometer. The light output of the interferometer is converted to electrical signals which are used to servo lock the peak depth of phase modulation of the interferometer and provide a digital output corresponding to the wavelength change sensed by the gyroscope. Temperature and input power variations otherwise adversely affecting the gyroscope performance are thus compensated. Gyro resolution is maintained to within 1Å without temperature stabilization or output conditioning over the entire temperature range of operation.

17 Claims, 3 Drawing Sheets

WAVELENGTH SENSOR FOR FIBER OPTIC GYROSCOPE

FIELD OF THE INVENTION

The present invention relates to fiber optic gyroscopes and more particularly to an error compensated wavelength sensor for scale factor correction of a fiber optic gyroscope.

BACKGROUND OF THE INVENTION

The Fiber Optic Gyroscope senses rotation based on the Sagnac effect named after the physicist who first demonstrated optical rotation sensing. The magnitude of the Sagnac effect is expressed as follows:

$$\phi_s = \frac{8\pi A N \Omega}{\lambda C}$$

where
- $\phi_s$ = Sagnac phase shift
- A = mean area of the closed optical path
- N = number of turns of Fiber
- $\Omega$ = rotation rate of the gyro
- $\lambda$ = wavelength of the light source in vacuo
- C = speed of light in vacuo In order for a rotation sensor to be used as a gyro, it must yield a repeatable output for a given input rotation rate. By inspecting the above equation it can be seen that $\phi_s$ can vary according to $\Omega$. This is a desirable relationship for a gyro. $\phi_s$ can also vary according to $\lambda$ which yields a change in $\phi_s$ that does not correspond to a change in rotation. This is not desirable for a gyro. The scale factor of the fiber optic gyroscope is commonly expressed as:

$$SF = \frac{8\pi A N}{\lambda C}$$

where
- SF = scale factor

Therefore, a change in $\lambda$ will produce a change in gyroscope scale factor, a specification which must be held to certain tolerances for a given application.

The light sources commonly used for fiber optic gyroscope applications are the Super Luminescent Diode (SLD) and the Edge Light Emitting Diode (ELED). These are chosen for their high output power (for good signal to noise characteristics), compact size, low power requirements, and broad spectral bandwidth with a nearly Gaussian wavelength distribution. The broad spectral width overcomes Rayleigh back scatter noise which would obscure the rotation signal and render the gyro useless for all but the least accurate requirements. The Sagnac phase shift is then based on the aggregate effect from the entire spectrum according to the centroid wavelength.

The centroid wavelength of a diode light source is temperature dependent. A typical wavelength change is 3Å/°C. which for usual fiber optic gyroscope geometries, would correspond to a scale factor change on the order of 100's of parts per million (ppm)/°C. For most applications, this degree of scale factor deviation due to wavelength change would be intolerable.

A popular approach for diminishing scale factor deviation due to wavelength variation, is tightly controlling the operating temperature of the diode. Diode light sources typically come with a Thermo-Electric Cooler (TEC) built into the package. The operating temperature of the diode can then be controlled via the TEC, at some temperature to within a few hundredths of a degree C.

Another approach employs a miniaturized, bulk optic interferometer inside the light source package which senses wavelength shift from some predetermined operating point. The optical signal is transformed into an electronic error voltage which is then used to servo the diode operating temperature via the TEC until null is again achieved.

Both of these approaches have a latent defect. The scale factor error due to wavelength is based on the centroid wavelength of the light as it exists in the fiber optic sensing coil. All of the optical components prior to the coil and the coil itself in general, act as wavelength filters. Due to the broad band nature of the light source spectrum, each optical component, therefore, would tend to alter the optical spectrum and thereby change the centroid wavelength of the light in the sensing coil. This alteration of the spectrum in the coil would be further compounded by each component's temperature sensitivity and would occur regardless of what was done to control the light source centroid wavelength. Although light source centroid wavelength control will help scale factor wavelength error, it does not yield the desired results due to the above optical component contribution.

Additionally, both of the above approaches have a problem with long term wavelength drift due to diode aging. For a given temperature the diode centroid wavelength will drift due to aging. The temperature control approach clearly does nothing to address this problem. The wavelength servo approach will attempt to always maintain a specific wavelength via the operating temperature of the diode. The problem with this is that the desired operating wavelength may, over time, appear at a temperature which will cause premature diode aging and failure.

The present invention addresses all of these problems and provides a novel and elegant solution.

SUMMARY OF THE INVENTION

It is thus an object of the present invention to provide real time and continuous error compensation for scale factor correction of a fiber optic gyroscope.

It is another object of the present invention to provide a means of sensing at a single most effective point in a fiber optic gyroscope circuit, the wavelength fluctuations contributing to undesirable gyro scale factor variations.

It is still another object of the present invention to provide a means for sensing and correcting gyroscope scale factor variations attributable to gyro light source wavelength variations caused by temperature, aging, or other effects.

It is yet another object of the present invention to provide a means for sensing undesirable light source wavelength fluctuations and correcting undesirable gyro scale factor variations without servoing the light source to a temperature that would cause premature light source aging.

It is further another object of the present invention to provide a means for measuring the centroid wavelength of light at a location in the gyro optical circuit where the light has exited the optical fiber sensing coil.

It is still another object of the present invention to provide an error compensated signal processing scheme for extracting unencumbered wavelength information from a fiber optic gyroscope.

The present invention is a novel Mach-Zehnder Interferometer integrated optical chip with a polarizing input means and an error eliminating signal processing output means. The polarizing input means connects the interferometer to a location in the gyro optical circuit containing light that has traversed the gyro optical sensing coil in both directions and exited. The output signal processing means operates to eliminate the effects of optical power fluctuations, and Mach-Zehnder phase modulator scale factor deviations caused by wavelength fluctuations, aging, and drive voltage changes, from the output of the wavelength sensor. The invention thus provides a wavelength readout capability for the fiber optic gyroscope so that gyro scale factor changes due to wavelength changes of the gyro light source can be compensated for into the gyro readout.

The MZI consists of two separated Y-junction power splitters, on an integrated optic (IO) chip separate from the FOG optical circuit chip. These Y-junctions accomplish the beam splitting and recombination functions. In addition, a phase modulator is added to each arm of the interferometer to facilitate the signal processing function. See FIG. 1.

In order for the MZI to be wavelength sensitive, there must exist an optical path length difference between the two arms. Normally this would be accomplished by physically making one arm longer than the other. This however, would make the interferometer a temperature sensor as well, and the output due to temperature changes would swamp the output due to wavelength changes, rendering it useless as a wavelength sensor.

Another way to accomplish the optical path length difference would be to make the index of refraction of one arm different than the other. In general, this would cause the same order of magnitude problem as the physical path difference mentioned above since index of refraction is temperate sensitive.

Therefore, there are temperature problems associated with building in physical and optical path length differences. However, it turns out that the IOC substrate material ($LiNbO_3$) happens to have an ordinary index of refraction ($n_o$) that is very nearly temperature insensitive at 1.3 $\mu$ the wavelength used for the NWC FOG. Therefore, an optical path length difference will be employed in a MZI configuration that takes advantage of the above to minimize temperature effects.

The MZI shown in FIG. 1, would be fabricated in x-cut $LiNbO_3$ with Ti indiffused waveguides. In order to make use of $n_o$ as the propagation index, a TM mode must be launched—this is the reason for the Ti waveguides. The gyro chip wave guides for example, are fabricated by an Annealed Proton Exchange (APE) process, and APE wave guides will not support TM modes. To excite the TM mode in the MZI chip with light from the gyro chip, the state polarization must be rotated through 90°. This can be accomplished with polarizing fiber aligned to the principal FOG chip axis, twisted end to end by 90°, and then attached to the MZI chip.

As mentioned earlier, the placement of the MZI in the gyro optical circuit is crucial for obtaining an accurate picture of the centroid wavelength experienced by the gyro. From FIG. 1, it can be seen that the light to the MZI has been around the fiber optic sensing coil in both directions. This is the light whose centroid wavelength has been acted upon by the coil and other components and thus the proper input for the MZI.

The MZI IO chip faces are polished at a 10° angle and the input and output optical fibers are polished at an angle of 15° to minimize back reflections at the chip to fiber interfaces.

Thus, the present invention measures the centroid wavelength of the light as it exits the sensing coil of the fiber optic gyroscope, which is the only valid measurement location for gyro scale factor correction. It addresses long term light source wavelength fluctuation and variation due to diode aging without servoing the diode to a temperature that would cause premature failure. It provides temperature desensitized interferometer operation and error compensated signal processing.

These and other advantages, features, and objects will be more clearly understood when the detailed description of the invention is studied in light of the accompanying drawings.

DRAWINGS

DETAILED DESCRIPTION OF THE INVENTION

Figure 1:
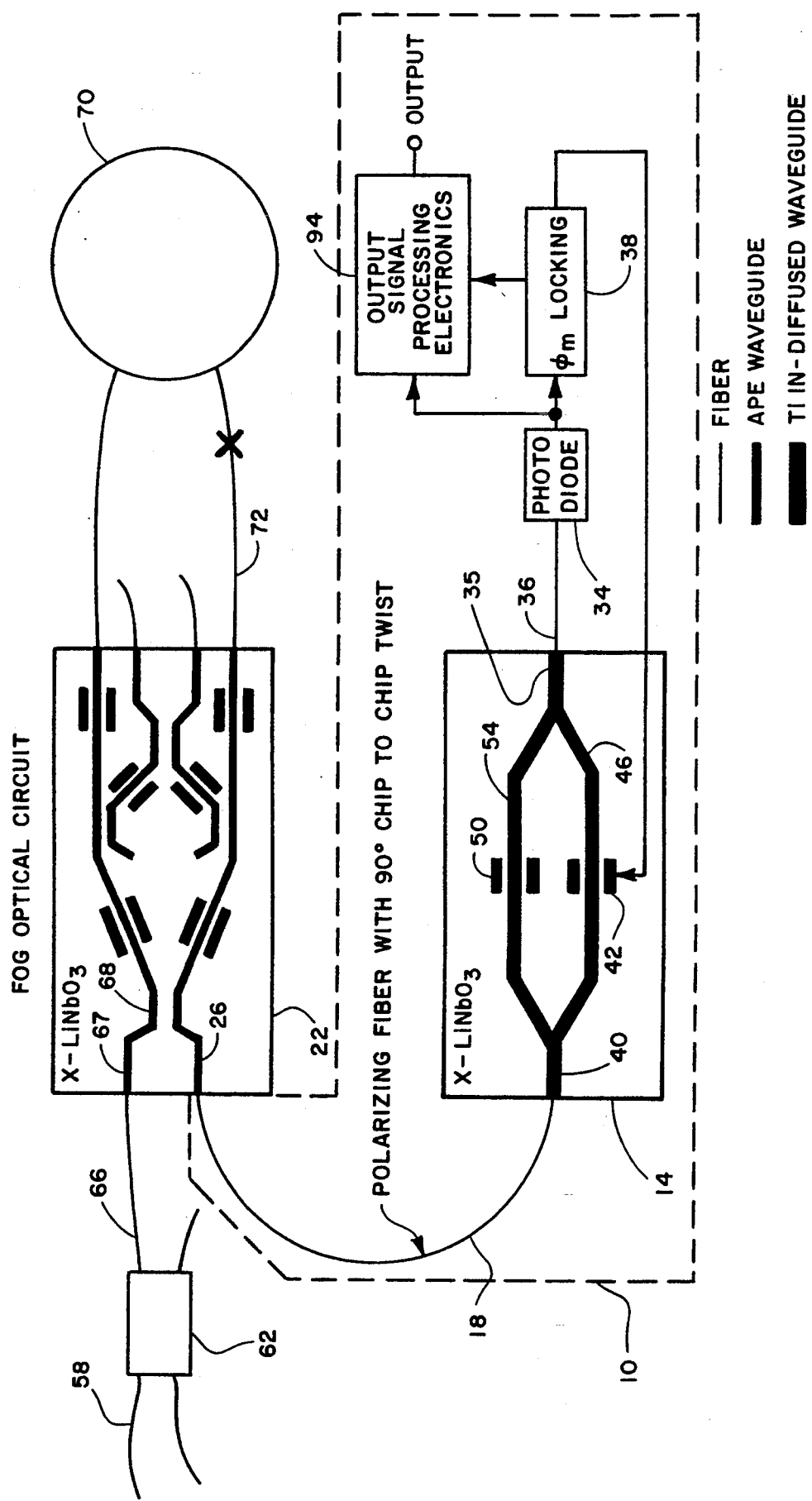
FIG. 1 is a schematic diagram of the Mach-Zehnder Interferometer of the present invention connected to the fiber optic gyroscope by means of the polarizing fiber and showing the photo diode output.

The present invention, the error compensated wavelength sensor 10 is shown in FIG. 1. The error compensated wavelength sensor 10 consists of the integrated optic chip Mach-Zehnder Interferometer 14 connected by means of the 90° twisted optical fiber polarizer 18 to the integrated fiber optic gyroscope chip 22 at the dead end waveguide 26 thereon. The error compensated wavelength sensor 10 further consists of the phase locking ($\phi_m$) electronics 38, and the photo diode 34 which is connected to the $\phi_m$ locking electronics 38 and the output signal processing electronics 94 shown in FIG. 1. The output signal processing electronics 94 also couples with the $\phi_m$ phase locking circuitry 38 to receive a reference signal therefrom. The photo diode 34 is coupled to the integrated optical chip Mach-Zehnder Interferometer 14 by means of the optical fiber segment 36 connecting to the titanium in-diffused waveguide segment 35 on the chip 14.

The optical waveguides as seen in FIG. 1 on the interferometer chip 14 are titanium in-diffused waveguides. The chip 14 is fabricated from a $LiNbO_3$ substrate. The optical fiber coupling between the fiber optic gyro integrated optic chip 22 and the integrated optical chip Mach-Zehnder Interferometer employs the 90° twisted optical fiber polarizer 18. One end of the 90° twisted optical fiber polarizer 18 connects with the dead-end waveguide 26 on the chip 22 while the other end couples to the input titanium in-diffused waveguide segment 40 on the chip 14. A first phase modulator 42 is shown deposited in juxtaposition with the first interferometer arm 46 on the chip 14. A second phase modulator 50 is located in the second interferometer arm 54 which lies in parallel on the chip 14 with the first interferometer arm 46.

It should be noted that the light input to the fiber optic gyro chip 22 is communicated in via the fiber optic segment 58 which feeds into the coupler 62. From the coupler 62 the input light travels through the fiber optic segment 66 to the entry segment 67 and through the remaining waveguide circuitry of the fiber optic gyroscope chip 22 through the fiber optic gyro coil 70 back through the Lyot depolarizer segment 72 and back through the chip 22 to the dead end waveguide 26 which then couples light out of the gyro chip 22 into the 90° twisted optical fiber polarizer 18. It will be recognized because of the coupling scheme shown on the fiber optic gyro chip 22 that light contained within the dead-end waveguide 26 includes components of the light entering the chip and exiting the chip after having traversed the coil 70 in both directions. It should also be noted that the waveguides in the fiber optic gyro chip 22, shown in FIG. 1, are fabricated by means of the annealed proton exchange process.

Figure 2:
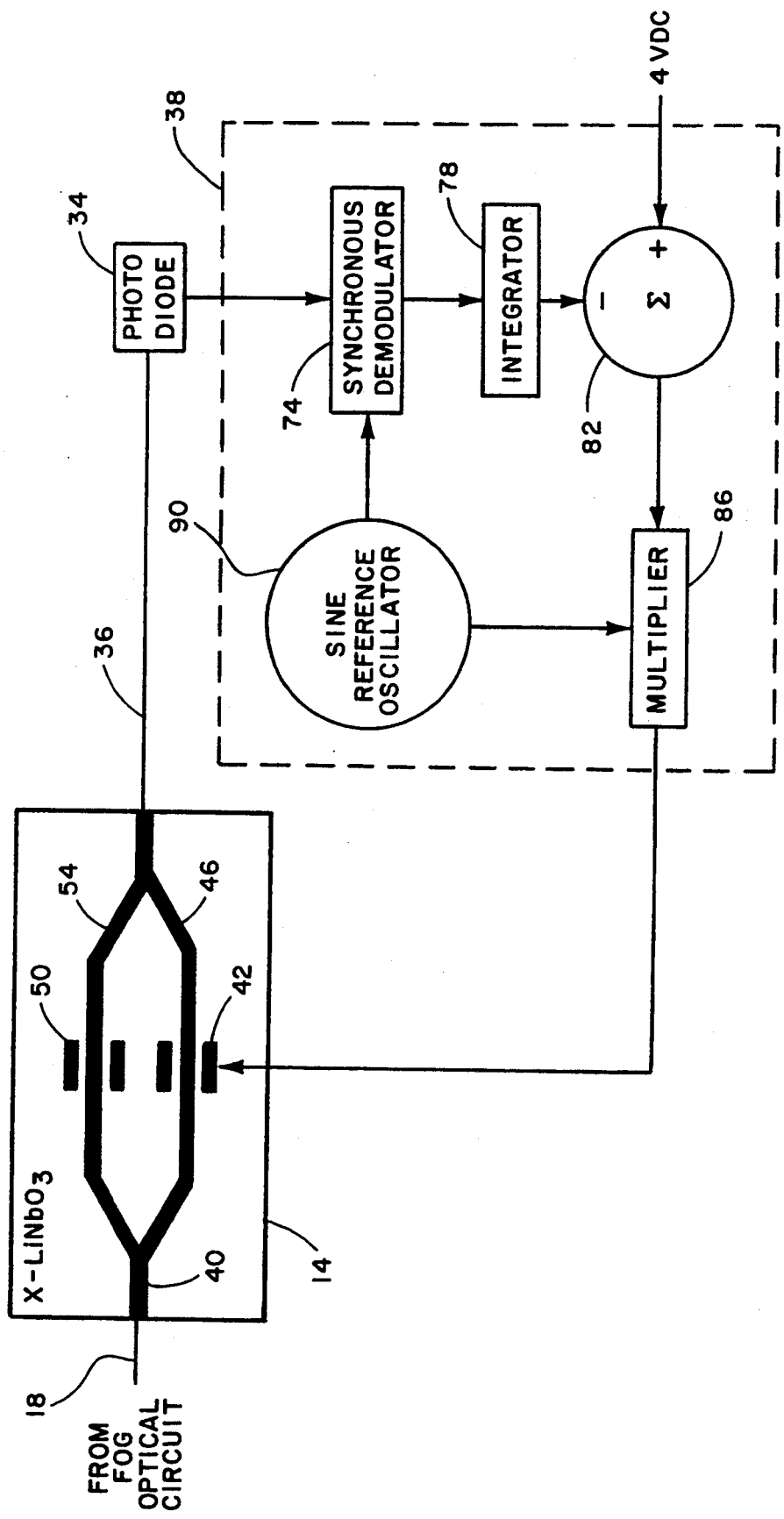
FIG. 2 is a schematic representation of the present invention showing its polarizing fiber on the input and the phase locking electronics as a control loop connecting to one phase modulator of the present invention.

FIG. 2 shows a somewhat more detailed representation of the $\phi_m$ locking approach of the present invention. Thus a portion of the error compensated wavelength sensor 10 is shown including the 90° twisted optical fiber polarizer 18 coupling light from the gyro chip 22 into the integrated optic chip Mach-Zehnder Interferometer (MZI) 14 via the input waveguide segment 40. The output of the MZI chip 14 is coupled via the optical fiber segment 36 to the photo diode 34 and then into the $\phi_m$ locking electronics 38 which include all of the signal processing for $\phi_m$ locking in the present invention. The $\phi_m$ locking electronics 38 are shown in FIG. 2 comprising the synchronous demodulator 74 which receives one input from the photo diode 34 and a second from a sine reference generator 90 and then provides its output to the integrator 78. The integrator 78 is connected directly to the summing junction 82 which also receives an input of 4 volts DC from a separate DC voltage supply which is not part of the invention. The output of the summing junction 82 is provided by means of a connection to the multiplier 86 which also receives an input from a direct connection with the sine reference oscillator 90. The output of the multiplier 86 is connected to the first phase modulator 42 on the integrated optic chip Mach-Zehnder Interferometer 14. Thus the external electronics constituting the $\phi_m$ locking electronics 38 completes a loop between the output from the chip 14 which is coupled to the photo diode 34 and returned as an input via the connection between the multiplier 86 and the first phase modulator 42 on the first interferometer arm of the Mach-Zehnder Interferometer (MZI) chip 14.

The waveguides of the Mach-Zehnder Interferometer (MZI) are formed in the LiNbO$_3$ substrate, by slightly elevating the indices of refraction via the Ti indiffusion process. The interferometer is made sensitive to wavelength changes by fabricating one arm with a different n$_0$ with respect to the other, to the extent that over the MZI length, a $\pi/2$ rad optical phase shift will exist at the center wavelength of choice. In the preferred embodiment of the present invention the wave length of choice is 1.3 $\mu$m. The reason for the $\tau/2$ bias is that the interferometer scale factor has a maximum slope at $\tau/2$.

The resultant phase difference between the light in each arm of the interferometer is expressed by $$\Delta\phi = 2\pi/\lambda \cdot \Delta n_o L$$

where $\Delta\phi$ = resultant phase difference $\Delta n_o$ = difference in ordinary propagation index of refraction between the two arms.

L = length of either arm of the interferometer.

$\lambda$ = light source centroid wavelength in vacuum.

Even though this approach yields a minimum index of refraction temperature dependence, there is some residual temperature sensitivity. This temperature sensitivity is a direct function of $\Delta n_o$, with a zero sensitivity as $\Delta n_o > 0$. Therefore, the invention uses the maximum L practical in order to achieve the $\tau/2$ bias with the minimum $\Delta n_o$ according to the above equation for $\Delta\phi$.

Using the $n_o$ model for LiNbO$_3$ the temperature dependence is written:

$$n_o(T) = \left[ P_{o25} + \frac{dP_o}{dT}(T-25) \right] + \left[ Q_{o25} + \frac{dQ_o}{dT}(T-25) \right] 1/\lambda^2 + \left[ R_{o25} + \frac{dR_o}{dT}(T-25) \right] 1/\lambda^4$$

where

T = temperature in °C.

$\lambda$ = light source centroid wavelength in vacuo $P_{o25}$ = Po at 25° C.

$Q_{o25}$ = Qo at 25° C.

$R_{o25}$ = Ro at 25° C.

Using: $-55°$ C. $\leq T \leq 80°$ C.

$\lambda = 1.3\ \mu$ $P_{o25}$ 32 2.196913

$Q_{o25} = 0.042167$ $R_{o25} = -0.001483$ $dP_o/dT = -1.8 \times 10^{-6}$ $dQ_o/dT = 2.7 \times 10^{-7}$ $dR_o/dT = 2.1 \times 10^{-6}$ in the above equation for $n_o(T)$, it can be shown that $n_o$ varies by approximately 50 parts per million (PPM)

Figure 3:
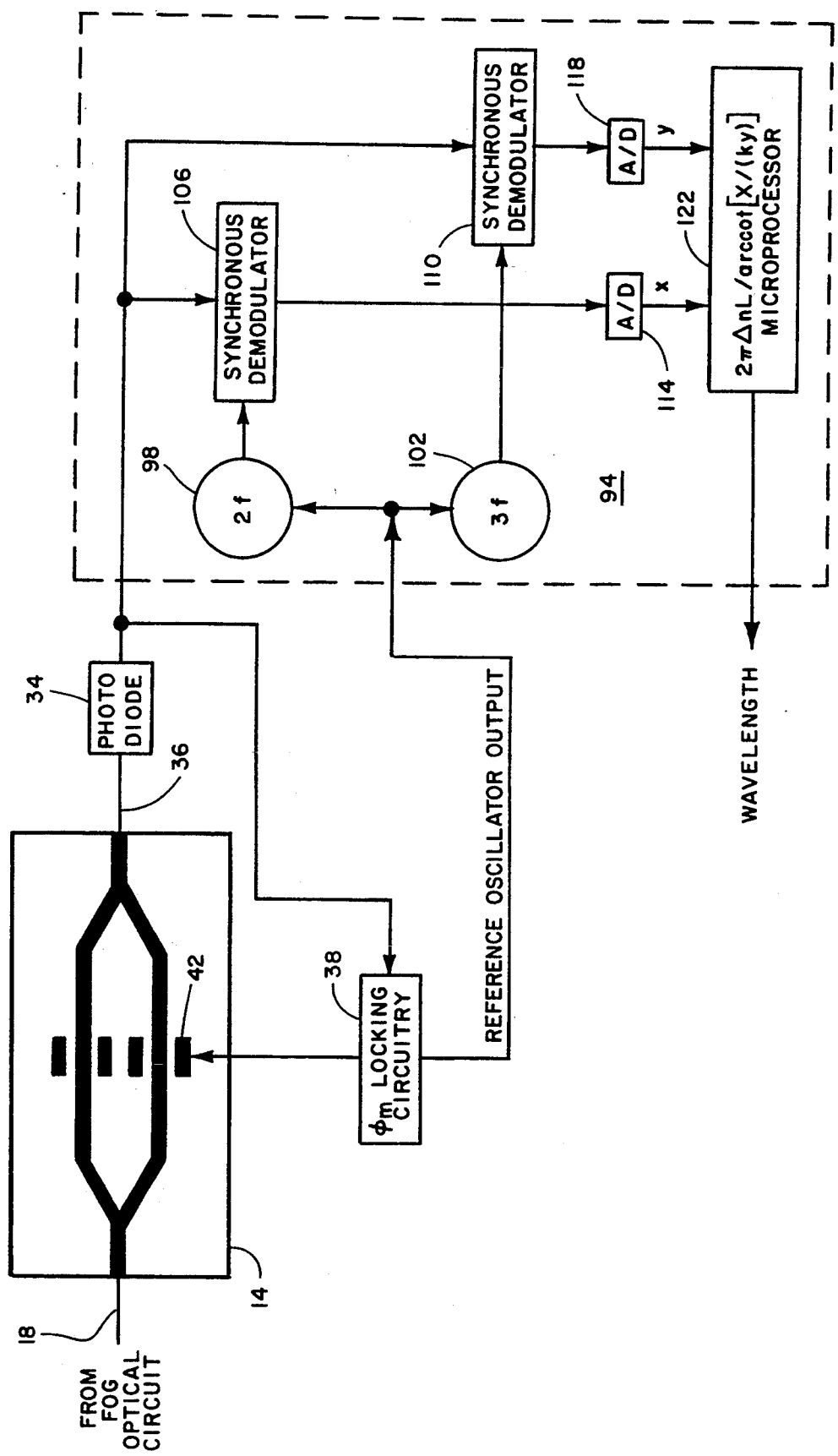
FIG. 3 is a schematic representation of the present invention showing the polarizing input, the phase-locking control loop, and the output processing electronics.

For integrated optical chips fabricated on standard 3 inch wafers, an L of 4 to 5 cm is possible. To be conservative, however, L for the present invention is chosen for one embodiment to be 4 cm. To achieve a $\tau/2$ bias at 1.3 $\mu$ using an L=4 cm $\Delta n_o$ becomes equal to $8.125 \times 10^{-6}$ from the $\Delta\phi$ equation. Using the 50 parts per adjacent harmonics and solving a simple equation not only yields $\lambda$, the wavelength, but also eliminates the power term P. Therefore, $\lambda$ is obtained from the ratio of the second and third harmonics by synchronously demodulating at these frequencies. Refer to FIG. 3. Comparing FIG. 3 with FIG. 2 it will be noted that the $\phi_m$ locking circuitry 38 in FIG. 3 contain the synchronous demodulator 74, the integrator 78, the summing junction 82, the multiplier 86, and the sine reference oscillator 90 shown in the $\phi_m$ locking circuitry 38 of FIG. 2. In FIG. 3 the light output of the MZI chip 14 is coupled to the photo diode 34. The output of the photo diode 34 connects back to the $\phi_m$ locking circuitry 38 and additionally the output of the photo diode 34 connects in parallel to the synchronous demodulator 106 and the synchronous demodulator 110. A second harmonic frequency oscillator 98 and a third harmonic frequency oscillator 102 are phase-locked to the sine reference oscillator 90. The second harmonic frequency oscillator 98 connects to provide an input to the synchronous modulator 106 and the third harmonic oscillator 102 connects directly to provide an input to the synchronous demodulator 110. The synchronous demodulator 106 connects directly to the analog to digital converter 114 to produce the X output which is fed in a direct electrical connection to the microprocessor 122. Likewise the synchronous demodulator 110 provides a signal through a direct electrical connection to the analog to digital converter 118 which produces the Y digitized output to the microprocessor 122. The microprocessor 122 utilizes the X input from the analog to digital converter 114 and the Y input in the analog to digital converter 118 to solve the wavelength equation as indicated in FIG. 3 to produce the wavelength information desired as an output from the present invention 10. From the equation for $V_o$ it can be seen that:

$$x = PJ_2(\phi_m) \cos\Delta\phi$$

$$Y = PJ_3(\phi_m) \sin\Delta\phi$$

It then follows that:

$$x/y = K \cot\Delta\phi$$

where $$K = \frac{J_2(\phi_m)}{J_3(\phi_m)}$$

Given that the first order zero of $J_1$ occurs at 3.83171 RAD, then K=0.957924. From the equation for $\Delta\phi$, $\lambda$ is solved:

$$\lambda = \frac{2\pi \Delta n_o L}{\text{arc cot}[x/ky]}$$

OPERATION

With reference to FIG. 1, FIG. 2, and FIG. 3 light from a super luminescent diode or an edge-light emitting diode is coupled into the integrated fiber optic gyroscope chip 22 via the fiber optic segment 58, the coupler 62, and the fiber optic segment 66. This light travels via the entry segment 67 into the coupler 68 on the chip 22 and because of the coupling effect travels in both directions through the fiber optic gyro coil 70. Thus at the dead end waveguide 26 light having traveled through the fiber optic gyro coil 70 in both directions is conveyed via the dead end waveguide 26 into the 90° twisted polarizing fiber 18. The polarizing fiber 18, due to its orientation to MZI chip 14, causes the polarization state of the light it carries to be rotated through 90° so that the TM mode is excited in the MZI chip 14. The light coupled from the gyro coil 70 is carried by the annealed proton exchange fabricated waveguides in the gyro chip 22 and from the chip to the polarizing fiber 18. APE fabricated waveguides do not support the TM mode. Thus the polarization state of the light has to be rotated through 90° so that it may excite the TM mode in the Ti waveguides of the MZI integrated optic chip 14. Polarizing fiber 15 is used to provide additional polarization rejection. The principle axis of fiber 18 is aligned to the principal axis of gyro chip 22 and the $n_o$ axis of MZI chip 14. By coupling light from the gyroscope chip 22 from the dead end waveguide 26 the centroid wavelength of the light experienced by the gyro is obtained. Thus it is the light whose centroid wavelength has been acted upon by the coil and all the other components preceding it in the optical gyroscope circuit that is obtained as the proper input for the MZI chip 14 as delivered by fiber 18.

As described above the waveguides of the MZI chip 14 are formed in the $LiNbO_3$ substrate by slightly elevating the indices of refraction of each via a Ti in-diffusion process. To make the interferometer sensitive to wavelength changes one arm is fabricated deliberately with a different $n_0$ with respect to the other arm to the extent that over the MZI length a $\tau/2$ RAD phase shift will exist at the center wavelength utilized for the gyro. In the preferred embodiment the center wavelength is at 1.3 microns. In order to minimize the temperature sensitivity of the Mach-Zehnder Interferometer chip 14 the $\Delta n_0$ is required to be as low a figure as possible. To facilitate this, it is desirable to use a maximum L or length of either arm of the interferometer in order to achieve a $\tau/2$ bias. This is in accordance with the equation for $\Delta\phi$, the resultant phase difference discussed above. The Mach-Zehnder Interferometer fiber optic chip 14 is thus configured to sense wavelength of the light exiting port 26. With reference to FIG. 2, the light output of the MZI chip 14 is coupled via the optical fiber segment 36 to the photo diode 34. The electrical output of the photo diode 34 is demodulated by the synchronous demodulator 74 and fed to the integrator 78. The output of the integrator 78 is fed to the summing junction 82 where the 4 volt DC bias voltage is added. The output of the summing junction 82 is communicated to the multiplier 86 where it is mixed with the sine reference oscillator 90 signal to produce an output which is fed to the first phase modulator 42 in the first interferometer arm 46 of the MZI Integrated optic chip 14. The effect of the signal supplied from the multiplier 86 to the phase modulator 42 in FIG. 2 is to cause the operating point ($\phi_m$) to be locked to a fixed point in phase space, and thus to obtain immunity from phase modulator 42 scale factor deviations and peak voltage $V_m$ deviations. Thus $\phi_m$ is servoed, using the maximum or peak applied $V_m$ the peak modulation voltage, to the first order null which occurs at approximately 3.83 RAD. The DC offset of 4 volts is in the loop to insure that when the circuit "wakes-up" the servo will drive towards the first order 3.83 RAD null and not the zeroeth order null which is a trivial solution of $V_m=0$ in the equation for $V_o$ as defined above as the output voltage from the photo diode 34. A 4.5 $V\tau$ is assumed for phase modulator 42.

The components in the output processing circuitry shown in FIG. 3 beyond the $\phi_m$ locking electronics 38 and the photo diode 34 provide the means for synchronously demodulating second and third harmonic signals to provide inputs to the $\mu$ processor 122 in order to solve the wavelength ($\lambda$) equation which is the output of invention 10. Thus the demodulated signals from synchronous demodulators 106 and 110 are fed to the analog to digital converters 114 to 118, respectively, to obtain the X and Y digital values used to solve the equation for $\lambda$. The solution for $\lambda$ obtained digitally from the microprocessor 122 is the wavelength sensed by the fiber optic gyro 14. Thus the external signal processing accomplished as shown in FIG. 3 provide a means for eliminating the effect of light source power fluctuations as well as providing the λ output of the invention which is used for scale factor correction of the fiber optic gyro. Due to fabrication uncertainties $\Delta n_0$ will not be precisely the value mentioned in the preceding discussions. It should be measured on one sample device from each batch, using a single laser line from a stable source and employing the equation for $\Delta\phi$ for a given L. The constants $\Delta n_0$, L, and K reside in the y-processors memory.

It should be understood that using the present invention and introducing temperature control by means of mounting the MZI chip to a thermal electric cooler with an attached temperature sensor on the chip and with a simple control circuit it would be possible to limit temperature excursions of the chip to 1° C. which would produce an approximate resolution of 0.01 Å which is sufficient for highly accurate navigation gyros. Furthermore, by using a temperature model of the invention, at least an additional order of magnitude of resolution improvement can be attained.

Another factor of variation that may be considered is to employ a reference frequency having a waveform other than a sine wave. Similar results can be obtained with harmonics other than the first, second, and third. Likewise the phase modulators can be used push-pull or single sided as described herein. The wavelength readout microprocessor 122 can be dedicated or incorporated in the gyro output conditioning circuitry. In this case, X and Y would be fed directly to the conditioning circuits. Other substrate materials exhibiting characteristics similar to LiNbO$_3$ can be used. MZI chip arm lengths other than 4 cm, and phase modulator V$\tau$ other than 4.5 can be used.

The MZI IO chip can be cut square with a 10° bevel at the waveguide surface for back-reflection reduction. Also antireflection coatings may be used for further affect. The chip input that is the MZI chip input can pigtailed with polarization maintaining fiber with or without a tightly bent loop for adding the polarization function. A signal to noise improvement may be obtained by biasing the interferometer by way of $\Delta n_0$ on a portion of a curve with a smaller derivative. Doing this however, will yield a diminished scale factor and the point chosen must take into account the aggregate noise characteristics of a photo diode module and signal processing circuitry. These and other variations of the present invention may well be perceived by those skilled in the art after having been informed of the details of the invention as described herein. Although the invention has been described with reference to a particular preferred embodiment, the scope of the invention is not limited to the particular embodiment described. Rather the scope and spirit of the invention are defined by the appended claims and equivalents thereof.

What is now claimed as the invention is:

1. An apparatus for correcting the scale factor of a fiber optic gyroscope, comprising:
    a means connected to said gyroscope to obtain light that has traveled in both directions therethrough, for sensing the wavelength of light in said gyroscope;
    a means connected to said sensing means, for processing the light from said sensing means, and producing error compensating signals and wavelength information; and
    a means for optically coupling the light output of said gyroscope to the input of said sensing means.

2. The apparatus of claim 1 wherein said means for sensing is a Mach-Zehnder-interferometer having a means in a first arm for producing an optical path length difference between said first arm and an opposite and parallel second interferometer arm.

3. The apparatus of claim 2 wherein said Mach-Zehnder interferometer consists of two y-shaped-junction power splitters, the arms of each Y connecting to opposite ends of a linear segment of optical waveguide, each of which segments lie parallel to each other, and the legs of each Y extending in opposite directions from each other and lying along an axis extending through each leg, said axis lying in parallel with each of said parallel linear optical waveguide segment and the arm of each Y shaped waveguide on the opposite ends of that segment constituting one of the two arms of the Mach-Zehnder interferometer, and one of said legs being the input to and the other said legs being the output from said interferometer.

4. The apparatus of claim 3 wherein said two Mach-Zehnder interferometer arms are fabricated relative to one another to produce a temperature-insensitive interferometer.

5. The apparatus of claim 4 wherein one arm of said Mach Zehnder interferometer is fabricated from material having a different index of refraction than the other and opposite arm of said interferometer.

6. The apparatus of claim 5 wherein said Mach-Zehnder interferometer is comprised of a substrate body of X-cut LiNbO$_3$, and Ti waveguides diffused in said body.

7. The apparatus of claim 1 wherein said means for coupling the light output of said gyroscope is a polarizing optical fiber twisted end to end by 90° and affixed between the output from said gyroscope optics and the input to said Mach-Zehnder interferometer optics.

8. The apparatus of claim 3 wherein a phase modulator is located in one interferometer arm.

9. The apparatus of claim 1 wherein said means for processing the light from said sensing means, comprises:
    a means for detecting the light output of said wavelength sensing means and producing an electrical output signal, said detecting means optically coupled to the output of said sensing means; and
    an electronic means for eliminating any input optical power fluctuations, said means for eliminating connected between the output of said detecting means and the output of said sensing means.

10. The apparatus of claim 9 wherein said light detecting means is a photo diode.

11. The apparatus of claim 8 wherein said means for processing the light from said interferometer and producing error compensating signals and wavelength information, comprises:
    a means for detecting the light output of said interferometer and producing an electrical output signal, said detecting means optically coupled to the output of said interferometer;
    an electronic means for eliminating any input power fluctuations, said means for eliminating connected between said phase modulator and said detecting means; and
    an electronic means electrically connected to said detecting means for computing wavelength information from the electrical output of said detecting means.

12. The apparatus of claim 11 wherein said light detecting means is a photo diode.

13. The apparatus of claim 8 wherein said means for processing the light from said interferometer and producing error compensating signals and wavelength information, comprising:
- a means for detecting the light output of said interferometer and producing an electrical output signal, said detecting means optically coupled to the output of said interferometer;
- a means for distinguishing between the output of said detecting means proportional to the wavelength change sensed by said Mach-Zehnder Interferometer and the output of said detecting means proportional to gyroscope input power fluctuations; and
- an electronic means for computing wavelength information from the electrical output of said detecting means.

14. The apparatus of claim 13 where said light detecting means is a photo diode.

15. The apparatus of claim 8 wherein said means for processing the light from said interferometer and producing error compensating signals and wavelength information comprises:
- a means for detecting the light output from said interferometer and producing an electrical output signal, said detecting means optically coupled to the output of said interferometer;
- a means for servo-locking a phase modulating carrier signal to said phase modulator in said interferometer; and
- a means for obtaining wavelength information from the electrical output of said detecting means.

16. An apparatus for correcting the scale factor of a fiber gyroscope, comprising:
- a Mach-Zehnder Interferometer connected to said gyroscope to obtain light that has traveled in both directions through said gyroscope, for sensing the wavelength of light in said gyroscope;
- a means connected to said interferometer for processing the light from said Mach Zehnder Interferometer and producing error compensating signals and wavelength information; and
- a means for optically coupling the light output of said gyroscope to the input of said Mach-Zehnder Interferometer.

17. The apparatus of claim 16 wherein said means for coupling the light output of said gyroscope to the input of said Mach-Zehnder interferometer is a means for polarizing and rotating the of said gyroscope prior to said input.

* * * * *